(12) United States Patent
Chiang et al.

(10) Patent No.: US 9,407,508 B2
(45) Date of Patent: Aug. 2, 2016

(54) CLIENT-SIDE INFERENCE OF WIRELESS NETWORK STATES

(71) Applicants: Mung Chiang, Princeton, NJ (US); Sangtae Ha, Princeton, NJ (US); Carlee Joe-Wong, Princeton, NJ (US); Harjot Singh Saluja, Nashua, NH (US); Shantigram Jagannath, Bangalore (IN); Wim Sweldens, New Providence, NJ (US)

(72) Inventors: Mung Chiang, Princeton, NJ (US); Sangtae Ha, Princeton, NJ (US); Carlee Joe-Wong, Princeton, NJ (US); Harjot Singh Saluja, Nashua, NH (US); Shantigram Jagannath, Bangalore (IN); Wim Sweldens, New Providence, NJ (US)

(73) Assignee: TUBE, Inc., Chelmsford, MA (US)

( * ) Notice: Subject to any disclaimer, the term of this patent is extended or adjusted under 35 U.S.C. 154(b) by 78 days.

(21) Appl. No.: 14/477,464

(22) Filed: Sep. 4, 2014

(65) Prior Publication Data

US 2015/0063152 A1 Mar. 5, 2015

Related U.S. Application Data

(60) Provisional application No. 61/873,495, filed on Sep. 4, 2013.

(51) Int. Cl.
*G06F 11/00* (2006.01)
*H04L 1/00* (2006.01)
*H04L 12/26* (2006.01)
*H04L 12/24* (2006.01)

(52) U.S. Cl.
CPC ............... *H04L 41/14* (2013.01); *H04L 43/50* (2013.01); *H04L 43/0852* (2013.01)

(58) Field of Classification Search
CPC .... H04W 28/0289; H04L 41/14; H04L 43/50
USPC ......................................... 370/252, 253, 254
See application file for complete search history.

(56) References Cited

U.S. PATENT DOCUMENTS

| | | | | |
|---|---|---|---|---|
| 7,941,118 | B2 * | 5/2011 | Catreux | H04B 7/0845 455/303 |
| 8,121,115 | B2 * | 2/2012 | Frankkila | H04L 47/2416 370/389 |
| 8,767,760 | B2 * | 7/2014 | Andreozzi | H04W 72/1252 370/235 |
| 8,780,755 | B1 * | 7/2014 | Gopi | H04L 41/0816 370/252 |
| 2002/0003793 | A1 * | 1/2002 | Poppe | H04L 1/0007 370/352 |
| 2007/0004415 | A1 * | 1/2007 | Abedi | H04W 36/18 455/442 |
| 2008/0008203 | A1 * | 1/2008 | Frankkila | H04L 47/2416 370/412 |
| 2009/0034598 | A1 * | 2/2009 | Catreux-Erceg | H04B 17/327 375/227 |
| 2009/0036081 | A1 * | 2/2009 | Catreux | H04B 7/0845 455/277.1 |
| 2009/0175182 | A1 * | 7/2009 | Shen | H04W 28/18 370/252 |
| 2013/0028220 | A1 * | 1/2013 | Andreozzi | H04W 72/1252 370/329 |
| 2014/0269752 | A1 * | 9/2014 | Bhanage | H04L 47/625 370/413 |

* cited by examiner

*Primary Examiner* — Chuong T Ho
(74) *Attorney, Agent, or Firm* — Meagher Emanuel Laks Goldberg & Liao, LLP

(57) ABSTRACT

A system configured to generate a utilization metric using a plurality of client devices coupled to a network server is disclosed. The system includes a channel condition monitor and a probe packet coordinator located on each client device, the channel condition monitor being configured to gather channel information, the probe packet coordinator being configured to format a packet train containing the channel information, the probe packet coordinator being configured to schedule or control the transmission timing of the packet train. The system also includes a network congestion calculator located at the network server, the network congestion calculator being configured to receive the packet train from each client device and generate a utilization metric based on the packet train received from each client device.

16 Claims, 5 Drawing Sheets

CLIENT-SIDE INFERENCE OF WIRELESS NETWORK STATES

CROSS-REFERENCE TO PRIOR FILED APPLICATIONS

This application claims the benefit of U.S. Provisional Application No. 61/873,495 filed Sep. 4, 2013, which is incorporated herein in its entirety.

TECHNICAL FIELD

This invention relates generally to systems and methods for detecting utilization of wireless networks. Disclosed herein are measurement and analysis techniques and data-driven method for use in communication systems and networks.

BACKGROUND

This disclosure pertains to the inference of available network capacity in wireless networks, including cellular networks in 2G, 3G, 4G and the like. It is useful to know network states (utilization), including channel and loading conditions in a given sector of a cellular network. Such information helps network operators and content providers using the network know the currently available network capacity and self-correct the usage, as well as predict the future conditions and accordingly provision capacity in different sectors of their network. It will also give insights into the quality experienced by users in different network sectors, which yields information about customer satisfaction that is useful to both network operators and online content providers, as well as the users themselves. Moreover, the knowledge of the network can help diagnose the causes of self-reported customer dissatisfaction.

It is difficult to know those states purely from network side. While the network side base stations have access to information pertaining to the channel conditions as well as the load, there are no means to bring this information out in a secure and scalable manner such that it can be collected, analyzed and useful for the content providers and subscribers. Moreover, for the information to be useful for the content providers and subscribers it will have to be collected and collated across all operators and over their many different types of vendor equipment Disadvantages of network side measurements include: a) non-real-time, b) costly, c) dependent on operators and vendors' variations.

It is possible and advantageous to infer such information from client devices, such as phones, tablets, laptops, game consoles and the like. Client devices are well integrated with content providers through the applications and are also constantly aware of the subscriber usage/location patterns. Such information can be made available to the consumers of that information in real-time, for example if there is a lot of available capacity in the network the content provider can choose to use it for the advantage of the user experience and at much lower cost to the operator.

In the wireless network the channel conditions are constantly changing and play a significant role in the experience as seen by the subscribers—any algorithms that have to measure the current available capacity and predict the available capacity in the future must account for the channel and the load conditions. An approach for measuring on the client side and crowd-sourcing across large numbers of clients, using analytics to consolidate the information for a per-sector analysis of the available capacity would be desirable.

SUMMARY OF THE INVENTION

A system configured to generate a utilization metric using a plurality of client devices coupled to a network server is disclosed. The system includes a channel condition monitor and a probe packet coordinator located on each client device, the channel condition monitor being configured to gather channel information, the probe packet coordinator being configured to format a packet train containing the channel information, the probe packet coordinator being configured to schedule or control the transmission timing of the packet train. The system also includes a network congestion calculator located at the network server, the network congestion calculator being configured to receive the packet train from each client device and generate a utilization metric based on the packet train received from each client device.

The channel condition monitor may be configured to gather channel information including at least one of signal-to-noise ratio (SNR), reference signal received quality (RSRQ) and reference signal received power (RSRP). The probe packet coordinator may be configured to generate a packet train having a predetermined number of packets each having a predetermined number of bytes. The probe packet coordinator may be configured to generate a packet train having a predetermined timing between packets. The timing between packets in the packet train may be based on a transmit time interval. The network congestion calculator may include a congestion calculator module configured to time stamp packets received in the packet train. The congestion calculator module may be configured to generate a per-client metric based on packet delays and packet interarrival times. The congestion calculator module may be configured to subtract a channel condition metric for each client device. The network congestion calculator may include a measurement aggregator configured to aggregate the per-client metrics from each client device.

The network congestion calculator may include a network predictor and scheduler configured to receive the utilization metric and generate scheduling data for transmission to each client device based on the utilization metric. The system client device may be configured with a download coordinator configured to receive the scheduling data and revise a transmit/receive schedule based on the scheduling data. The client device may be configured with a download coordinator configured to receive the utilization metric and revise a transmit/receive schedule based on the utilization metric. The network congestion calculator may include a confidence calculator configured to generate a confidence level. The network congestion calculator may include a network predictor and scheduler configured to receive the confidence level and generate scheduling data for transmission to each client device based on the confidence level. The client device may be configured with a download coordinator configured to receive the confidence level and revise a transmit/receive schedule based on the confidence level.

A method for generating a utilization metric using a plurality of client devices coupled to a network server is also disclosed. The method includes, at the client device, monitoring channel conditions and gathering channel information, formatting a packet train containing the channel information, scheduling or controlling the transmission timing of the packet train to the network server. The method also includes, at the network server, receiving the packet train from each client device and generating a utilization metric based on the packet train received from each client device.

Gathering channel information may include at least one of signal-to-noise ratio (SNR), reference signal received quality (RSRQ) and reference signal received power (RSRP). The packet train may have a predetermined number of packets each having a predetermined number of bytes. The packet train may have a predetermined timing between packets. The timing between packets in the packet train may be based on a transmit time interval. The packets received in the packet train may be time stamped at the network server. A per-client metric may be generated based on packet delays and packet interarrival times at the network server. At the network server, a channel condition metric may be subtracted for each client device. At the network server, the per-client metrics from each client device may be aggregated.

At the network server, the utilization metric may be received and scheduling data may be generated for transmission to each client device based on the utilization metric. At the client device, the scheduling data may be received and a transmit/receive schedule may be revised based on the scheduling data. At the client device, the utilization metric may be received and a transmit/receive schedule may be revised based on the utilization metric. At the network server, a confidence level may be generated. At the network server, the confidence level may be received and scheduling data may be generated for transmission to each client device based on the confidence level. At the client device, the confidence level may be received and a transmit/receive schedule may be revised based on the confidence level.

DETAILED DESCRIPTION

Figure 1:
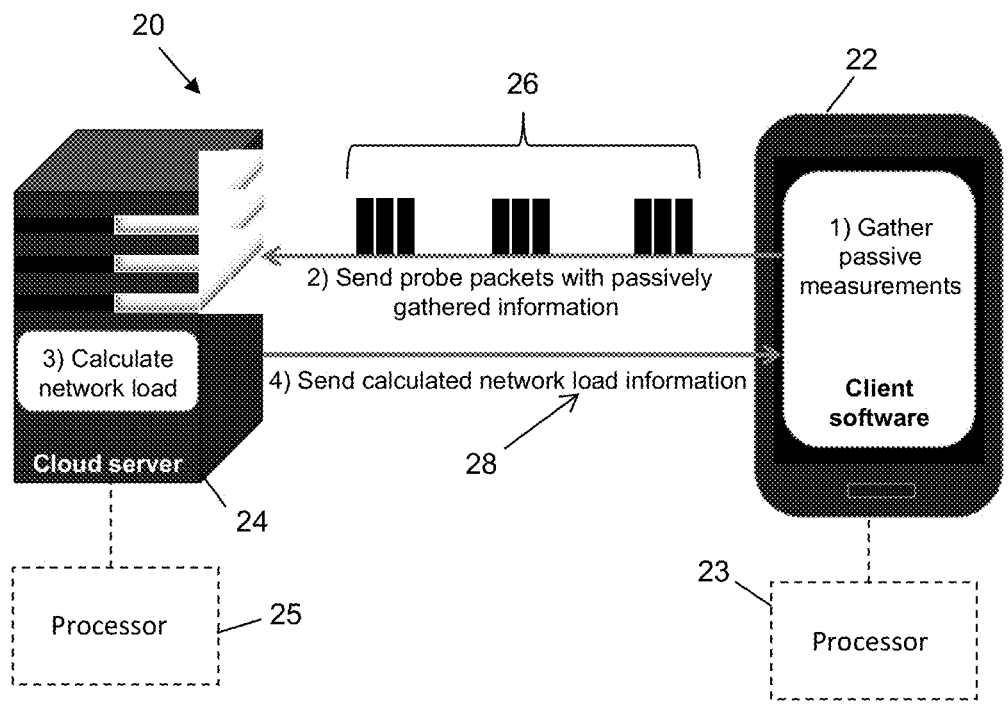
FIG. 1 is a block diagram showing the sequence of communication between a client device and the cloud server for sending probing data.

Some important aspects of the disclosed system include: a) the capability to infer the network utilization from low-overhead measurements conducted by client devices, e.g., smartphones or tablets, connected to the network; b) the capability to combine these low overhead measurements from several devices at different times and locations within the sector to create a heat map for predictive analysis; c) the capability to combine measurement of channel and load inference of the network to get a measure of the available sector capacity for a subscriber application; d) the capability to combine active probe measurement with passive sniffing on application performance metrics to further lower the overhead of the measurements. Devices connected to each sector measure the conditions for that sector. At regular time intervals, each device queries a nearby central server by sending a train of probe packets. Each packet is time stamped upon sending and upon receipt. The timestamps are used to measure the packet delay and interarrival times.

In addition to the delay and interarrival measurements from active packet probing, the invention utilizes passive channel condition measurements from the client device. These include physical layer metrics such as the received power and the signal to noise ratio, which the device tracks as part of normal data transmission procedures.

A network server, e.g., located in the cloud, aggregates the active and passive measurements from client devices in each sector to calculate an overall wireless network sector utilization metric for all devices within the sector. The robustness and efficacy of this calculation is enhanced by the "crowdsourcing" of data collection to multiple devices, which generally experience a diversity of channel conditions. In some cases, it is not possible to send uplink or downlink probes from some clients (e.g., to limit data consumption by the device). In this case, clients can send passively gathered channel quality information to the server, but the client and server do not exchange probes.

While calculating the channel and loading of different network sectors, the cloud server compares client measurements to historical data. Such historical measurements serve as a comparison baseline to place observations in context (e.g., the minimum packet delay observed for given channel conditions). Historical data can also affect confidence measures by providing typical network utilization metric for different times of the day; deviations from that state, unless backed by multiple measurements, would be treated with less confidence.

After calculating network load measurements, the cloud server controller can leverage these for various applications. For instance, this information may be used to create a network utilization heat map. A network utilization heat map may be generated by plotting the network utilization metric at different locations covering one or more operator networks. More proactively, the server or client may intelligently coordinate client traffic based on the network utilization metric and optionally the confidence level so as to avoid the period where utilization is high.

An app on each client device can interface with the central server to conduct active and passive measurements and receive scheduling signals. This functionality can also be implemented in a software development kit (SDK) integrated into third-party apps. Such an SDK would background the app so as to enable regular active probing and would include API calls enabling intelligent scheduling of that app's content to avoid periods of high utilization. The app or SDK may track the amount of data consumed by probes over the month and constrain the number of probes sent accordingly so as to stay within limits on the amount of data used by the device.

The disclosed system infers the current network utilization using client-side measurements. FIG. 1 shows a basic system configured to generate a utilization metric using a plurality of client devices coupled to a network or cloud server. FIG. 1 also shows the sequence of communication between a client device 22 and a network (cloud) server 24 for the transmission of probing data. First, the client device 22 gathers passive measurement information. The client device 22 then generates a packet train 26 including the passive measurement information. The packet train 26 is transmitted to the network server 24. The network server 24 receives the packet train then calculates the network utilization metric (network load information) and optionally a confidence level and sends this information back to the client device 22 as generally shown by reference number 28. The packet train 26 may be configured for transmission at regular time intervals (e.g., of 5 or 10 minutes) or an irregular time interval triggered by the need for finer-granular measurement. It should be understood that a plurality of client devices may be configured to send packet trains to the network server 24. It should be understood that the client device 22 and network server 24 may include one or more processors as shown generally by blocks 23 and 25 respectively. In more detail:

1) The client inserts channel information such as the signal-to-noise ratio (SNR), reference signal received quality (RSRQ), and reference signal received power (RSRP) into x-byte packets for data transmission, where x is a number such as 50. The channel information may be generated by conventional means. In this example, the channel information is generated by a channel condition monitor; see e.g. FIG. 5, reference number 63.

2) The client sends a train of y such packets, where y is a number such as 50 and the packets are separated by a certain number of seconds, each packet of size x bytes, to the central server with an inter-packet gap equal to the base station transmission time interval (e.g., 1 ms for LTE networks). In this example, packet formatting and timing/coordination of the packet train is performed by a probe packet coordinator, see e.g. FIG. 5, reference number 62.

Figure 3:
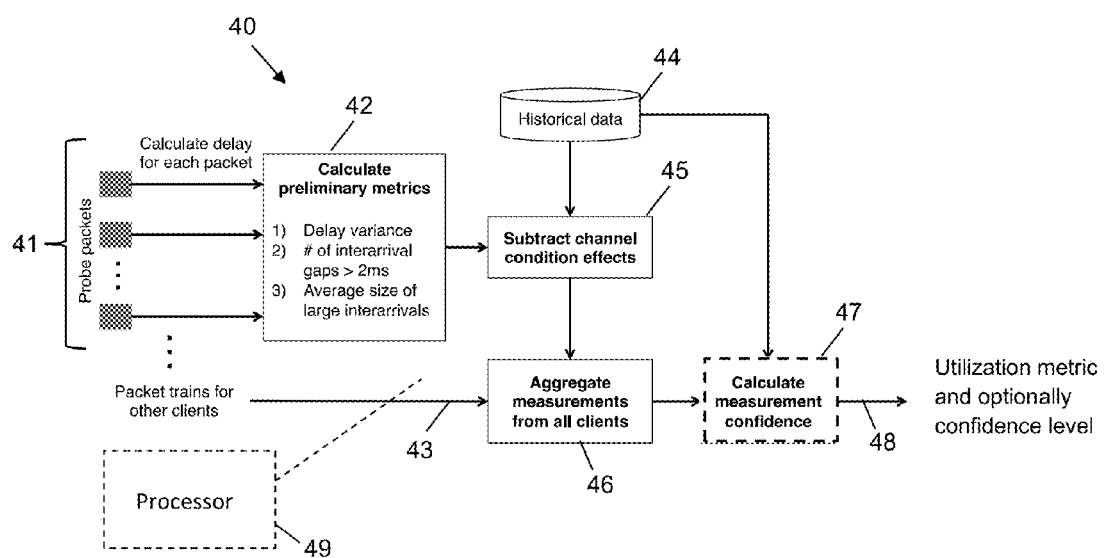
FIG. 3 is a block diagram showing a network utilization calculator at the server.

3) The server calculates the network utilization metric (network load information or network state) as generally as show in FIG. 3 using the packet delay, calculated as (received time—sent time), as well as the packet interarrival times. In this example, a network congestion calculator may be used to perform the calculation of the utilization metric, see e.g. FIG. 3, reference number 40 and FIG. 5.

4) The network utilization metric and optionally the confidence level is sent back to the client for further processing such as use in subsequent scheduling of data requests.

Figure 2:
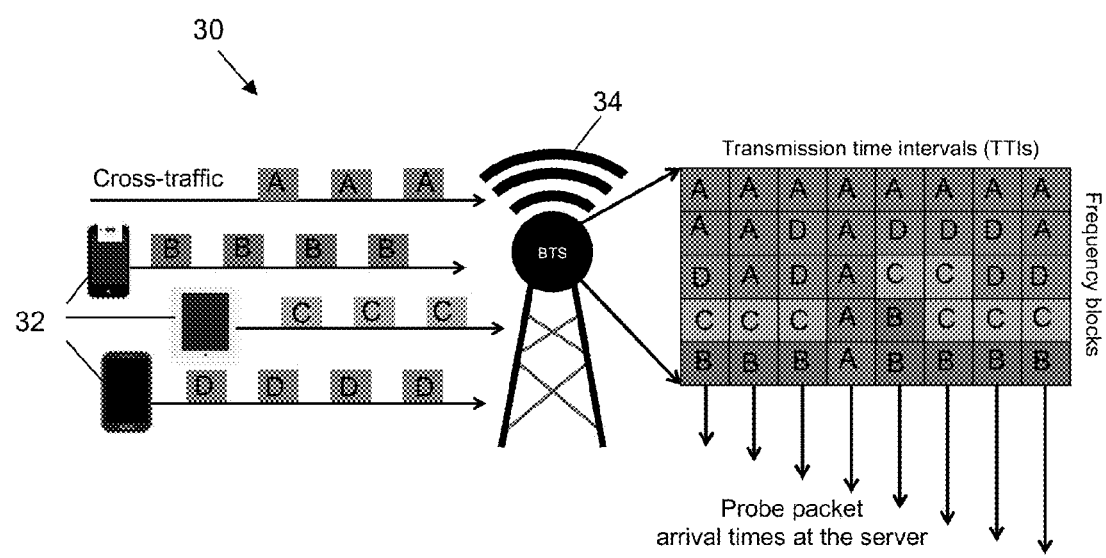
FIG. 2 is a block diagram showing the scheduling of packet trains from multiple clients at a BTS (base transceiver station)

As explained above, the client is configured with a channel condition monitor that is configured to generate channel information. The client is also configured with a packet probe coordinator that formats the packets with the channel information and coordinates the timing on the packet train transmission. This approach relies on channel condition measurements as well as packet delays and interarrival gaps which reflect the presence of cross traffic at the base transceiver station (BTS). As shown in FIG. 2, each packet in a train is assigned to a resource block (i.e., a frequency block during a specified TTI). Packets are either placed into a frequency block upon requesting to transmit to the BTS or, if no resource blocks are available, are queued to wait for available frequency blocks at subsequent TTIs. Priority is given to packets coming from clients with good channel conditions, as higher throughput can be achieved for the same number of resource blocks.

The absence of available resource blocks shows that utilization is high in the network: other clients are sending a significant amount of traffic, which is taking priority over the probe traffic. This cross traffic generally consists of TCP acknowledgement packets along uplink for downlink data transfers; e.g., 1 acknowledgement packet is sent for every 2 downlink packets. Thus, the presence of uplink traffic reflects increased downlink traffic.

FIG. 2 is a block diagram of a system 30 showing multiple client devices 32 communicating with a base transceiver station (BTS) 34. FIG. 2 also shows the scheduling of packet trains from the client devices 32 at the BTS 34. Packets from each device are labeled with A, B, C or D for cross traffic and each client device 32. Each packet, represented by a square, is scheduled by the BTS into a resource block, which is comprised of a frequency block during one transmission time interval (TTI). The assigned TTI determines the packet arrival time at the server. Since a probe packet is sent once per TTI, in the absence of cross traffic the packet arrival times at the server would have the same spacing and all packets would experience the same delay. Packets that are forced to wait for available frequency blocks experience higher interarrival times due to TTI gaps in which no probe packets are assigned to resource blocks, as shown by the fourth TTI from the left in the table in FIG. 2. The larger the gaps, i.e., the longer that cross traffic interrupts probe scheduling, the higher the utilization in the network. It should be understood that the network server may be located at the base station or another location in the cloud. The network server may be configured to serve one or more base stations.

Packets forced to wait for available resource blocks experience an additional queuing delay that increases their overall one-way delay (i.e., time between being sent from the client and received from the server). The observed one-way delays of different packets will then vary to a larger extent due to varied queuing delays, and the larger this variance, the more packets are queued. Thus, the presence of large interarrival times and more varied delays can be used to measure the amount of cross traffic experienced at the BTS.

FIG. 3 is a block diagram showing a network utilization calculator 40 which may be located at the network server. It should be understood that the network server may include one or more processors as shown generally by block 49. As probe packets 41 arrive from each client, a preliminary metric module 42 calculates a per-client metric based on packet delays and interarrival times. The effect of the client's channel condition is then removed as shown generally by block 45 using observed historical data which may be stored in a historical data database 44. Measurements from all clients, including packet trains from other clients 43 are then aggregated to generate the utilization metric as shown generally by block 46. A confidence level is optionally calculated as shown generally by block 47 before the utilization metric and optionally generated confidence level is output as shown generally by reference number 48. FIG. 3 shows how the two metrics of delay variance and packet interarrivals are used to estimate the utilization metric. First, the preliminary metric module 42 uses the timestamps of each client's packet train to calculate the delay for each packet (i.e., received time at the server—sent time at the client) and the packet interarrival time, i.e., the gap between arrival times of consecutive packets within one train at the server. These statistics for each packet are then condensed into three measurements: 1) the variance of the packet delays, 2) the number of interarrival times greater than 2 times the TTI, and 3) the average size of these large interarrival gaps. The effect of the client's channel condition is then subtracted from these three metrics by comparison of the observed values to those observed historically under the same channel conditions. For instance, the historical data can give a good estimate of the minimum delay variance experienced for a given channel condition.

After the channel condition effect has been removed, the server aggregates measurement data from all clients by examining the distribution of the three metrics over different clients in the same sector. For example, weighted averages can be taken of each client's network utilization estimate with the weights determined by the channel conditions of each client. Depending on the spread of the distribution and the expected network utilization metric, which is taken from historical data, a confidence level is computed that indicates the likelihood that the aggregated network utilization measurement is correct. There are several possible ways to compute the confidence level, such as calculating the standard deviation of the utilization metrics computed using each individual client's probe data. An alternative method would be to take a weighted sum of the differences between the expected network utilization, as taken from historical data, and the network utilization estimate computed by each client. This final network utilization metric and accompanying confidence level is then output for use either at the client or in other modules at the server.

Figure 4:
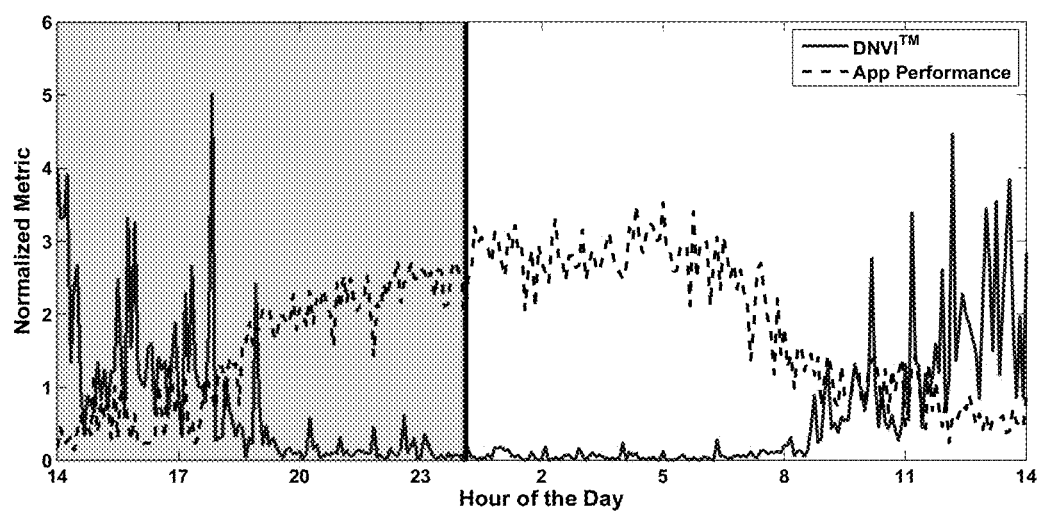
FIG. 4 is a graph showing sample output of the network utilization metric for a given sector over 24 hours.

FIG. 4 is a graph showing sample output of the network utilization for a given sector over 24 hours. The DNVI line shows the estimated network utilization level over a 24 hour period. It is shown to be inversely correlated with empirical application performance, measured at the same time. Thus, as the network utilization increases, the observed application performance degrades. If the client and server did not exchange probe packets, the server can estimate the network congestion from channel quality measurements. Since channel quality is affected by the base station power allocated to each client, the server can infer the approximate number of clients present from channel quality measurements.

Figure 5:
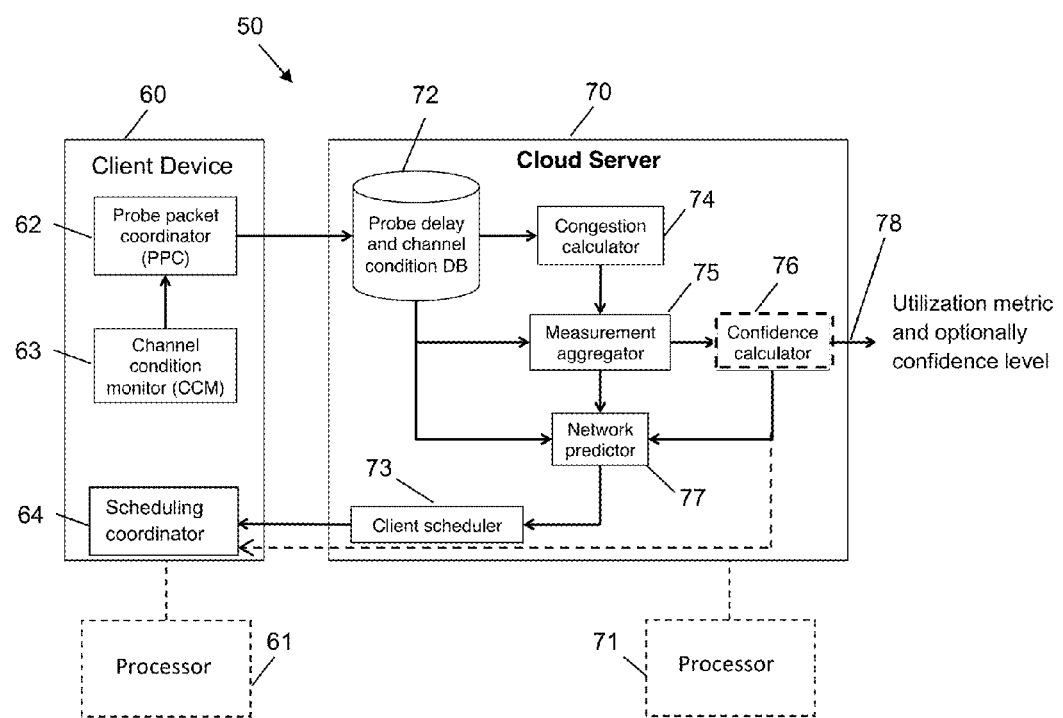
FIG. 5 is a block diagram of an overall architecture of a client-server system.

One embodiment of such a system has been implemented, tested, and validated. FIG. 5 shows a block diagram of the overall architecture of the client-server system 50. It should be understood that the client device 60 and network server 70 may include one or more processors as shown generally by blocks 23 and 25 respectively. It should also be understood that client device 60 is shown only with the relevant structure needed to generate a probe packet train as disclosed herein. Similarly, only the network congestion calculator portion of the network server 70 is shown for purposes of clarity. The client device 60 and network server may be configured with additional hardware and software as is well known in the art. The system can be used in connection with at least two applications: creating a utilization heat map and scheduling client data traffic. The client includes a channel condition monitor 63 configured to passively probe its channel condition and generate channel information. The client also includes a probe packet coordinator 62 configured to send the channel information in a train of probe packets to the network server 70. The network server 70 then calculates the per-client congestion via congestion calculator 74. In this example, the congestion calculator 74 also subtracts the channel conditions as shown by blocks 42 and 45 in FIG. 3. The network server 70 then aggregates the per-client congestion measurements across all clients via measurement aggregator 75. The network server 70 then calculates a confidence level via confidence calculator 76. The output of the confidence calculator (congestion or utilization metrics) can be immediately output into a heat map, or can be used to predict the future network utilization and schedule client data transfers accordingly as shown generally by blocks 73 and 77. The scheduling coordinator 64 on the client device 60 may be configured to enforce these schedules received from the scheduler 73. In the alternative, the scheduling coordinator 64 may be configured to receive the utilization metric and optionally the confidence level from the network server 70 and intelligently coordinate client traffic based on the network utilization metric and optionally the confidence level.

The utilization heat map generally shows the current utilization for sectors in different operator networks. Such data would be useful for operators to diagnose locations of high utilization, which would benefit the most from additional capacity. It would also help them identify how their network compared to competitors'; similarly, customers could use this data to find the provider with the network with the most available capacity in their area.

Another application of network utilization inference is to schedule client data transfers into periods of lower utilization. To do so, a network predictor module as in FIG. 5 would predict the future network utilization based on the current utilization and historical observations. Given such predictions, data transfers from different clients can be scheduled to lightly utilized times in a scheduling module. These transfers are of two types: preloaded content, and delayed content. Preloaded content might consist of regular magazine or newspaper updates that can be downloaded by the client before the user tries to access this content, while delayed content might consist of time-insensitive traffic such as application updates.

A major challenge of scheduling data transfers from different clients lies in the possibility of inducing congestion at previously lightly utilized times due to excessive scheduling of preloaded or delayed content. The server therefore must use its knowledge of the degree of network utilization to ensure that only as much data is scheduled for that time as the network can handle without becoming too congested. Moreover, if some data transfers have scheduling deadlines, it must use the future predicted network utilization to ensure that these deadlines are met. The predicted network utilization can be monitored in real time by tracking the channel conditions. Such passive tracking can be done locally on each user device, with scheduling adjusted in real time between probes if the channel quality changes significantly.

In order to conduct probing and enforce any data transfer schedules, our system may be implemented using software modules residing on the client, as shown generally in FIG. 5. The software modules may be implemented as a separate client app or a software development kit (SDK) residing in a third-party app.

It should be understood that many variations are possible based on the disclosure herein. Although features and elements are described above in particular combinations, each feature or element can be used alone without the other features and elements or in various combinations with or without other features and elements. The methods or flow charts provided herein may be at least partially implemented in a computer program, software, firmware incorporated in a non-transitory computer-readable storage medium for execution by a general purpose computer or a processor. Examples of computer-readable storage mediums include but are not limited to read only memory (ROM), a random access memory (RAM), a register, cache memory, semiconductor memory devices, magnetic media such as internal hard disks and removable disks, magneto-optical media, and optical media.

What is claimed is:

1. A system configured to generate a utilization metric using a plurality of client devices coupled to a network server, the system comprising:
    a channel condition monitor and a probe packet coordinator located on each client device, the channel condition monitor being configured to gather channel information, the probe packet coordinator being configured to format a packet train containing the channel information, the packet train having a predetermined timing between packets, the probe packet coordinator being configured to schedule or control the transmission timing of the packet train;
    a network congestion calculator located at the network server, the network congestion calculator being configured to receive the packet train from each client device and generate a utilization metric based on the packet train received from each client device, the network congestion calculator including a congestion calculator module configured to generate a per-client metric based on packet delays and packet interarrival times, the congestion calculator module being configured to subtract a channel condition metric for each client device, the utilization metric may be output to a heat map or may be used to predict future network utilization.

2. The system of claim 1 wherein the channel condition monitor gathers channel information including at least one of signal-to-noise ratio (SNR), reference signal received quality (RSRQ) and reference signal received power (RSRP).

3. The system of claim 1 wherein the timing between packets in the packet train is based on a transmit time interval.

4. The system of claim 1 wherein the congestion calculator module is configured to time stamp packets received in the packet train.

5. The system of claim 1 wherein the network congestion calculator includes a measurement aggregator configured to aggregate the per-client metrics from each client device.

6. The system of claim 1 wherein the network congestion calculator includes a network predictor and scheduler configured to receive the utilization metric and generate scheduling data for transmission to each client device based on the utilization metric.

7. The system of claim 6 wherein the client device is configured with a download coordinator configured to receive the scheduling data and revise a transmit/receive schedule based on the scheduling data.

8. The system of claim 1 wherein the client device is configured with a download coordinator configured to receive the utilization metric and revise a transmit/receive schedule based on the utilization metric.

9. A method for generating a utilization metric using a plurality of client devices coupled to a network server, the method comprising:

at the client device, monitoring channel conditions and gathering channel information, formatting a packet train containing the channel information, the packet train having a predetermined timing between packets, scheduling or controlling the transmission timing of the packet train to the network server; and at the network server, receiving the packet train from each client device and generating a utilization metric based on the packet train received from each client device, generating a per-client metric based on packet delays and packet interarrival times, subtracting a channel condition metric for each client device, the utilization metric may be output to a heat map or may be used to predict future network utilization.

10. The method of claim 9 wherein gathering channel information includes at least one of signal-to-noise ratio (SNR), reference signal received quality (RSRQ) and reference signal received power (RSRP).

11. The method of claim 9 wherein the timing between packets in the packet train is based on a transmit time interval.

12. The method of claim 9 further comprising, at the network server, time stamping packets received in the packet train.

13. The method of claim 9 further comprising, at the network server, aggregating the per-client metrics from each client device.

14. The method of claim 9 further comprising, at the network server, receiving the utilization metric and generating scheduling data for transmission to each client device based on the utilization metric.

15. The method of claim 14 further comprising, at the client device, receiving the scheduling data and revising a transmit/receive schedule based on the scheduling data.

16. The method of claim 9 further comprising, at the client device, receiving the utilization metric and revising a transmit/receive schedule based on the utilization metric.

* * * * *